United States Patent

Koyanagi et al.

Patent Number: 5,294,185
Date of Patent: Mar. 15, 1994

[54] RESTRAINING PROTECTIVE SEAT FOR INFANTS

[75] Inventors: Toshiro Koyanagi; Shizutaka Matsuura, both of Hikone, Japan

[73] Assignee: Takata Corporation, Tokyo, Japan

[21] Appl. No.: 981,204

[22] Filed: Nov. 25, 1992

[30] Foreign Application Priority Data

Dec. 5, 1991 [JP] Japan .................. 3-322097

[51] Int. Cl.[5] .............. B60R 21/00; B60R 22/36
[52] U.S. Cl. .................. 297/484; 297/468; 297/483; 280/808; 280/801 R
[58] Field of Search ........... 297/464, 468, 483, 250; 280/807, 808, 801 R

[56] References Cited

U.S. PATENT DOCUMENTS

| | | | |
|---|---|---|---|
| 3,248,148 | 4/1966 | Board et al. | 297/388 |
| 4,321,592 | 11/1980 | Scherenberg et al. | 297/483 |
| 4,342,483 | 8/1982 | Takada | 297/484 |
| 4,431,233 | 2/1984 | Ernst | 297/483 |
| 4,688,849 | 8/1987 | Tsuge et al. | 297/250 |
| 4,884,825 | 12/1989 | Urunewald et al. | 297/483 |
| 4,886,315 | 12/1989 | Johnson | 297/484 |
| 4,912,818 | 4/1990 | Meeker | 297/484 |

Primary Examiner—Clifford D. Crowder
Assistant Examiner—Bibhu Mohanty
Attorney, Agent, or Firm—Armstrong, Westerman, Hattori, McLeland & Naughton

[57] ABSTRACT

An infant-restraining protective seat includes a shoulder-belt adjusting device (6) provided on a seat back. The shoulder-belt adjusting device (6) includes a belt guide (101) for guiding shoulder belts (5a) in such a manner that the position of the shoulder belts can be adjusted up or down, supporting means (102) for supporting the belt guide (101), a vertically extending screw shaft (103) for moving the supporting means (102) up and down, an operating knob (104) turnably attached to the left side wall (33) of the seat back (3), and a torque link (105) which connects the operating knob (104) and the screw shaft (103) while producing a right-angle change in direction, and which transmits the rotational torque of the operating knob (104) to the screw shaft (103). The lower end of the screw shaft (103) is supported so as to be capable of rotating in a state in which the shaft is supported in the thrust direction by means of a lower bracket (37).

1 Claim, 19 Drawing Sheets

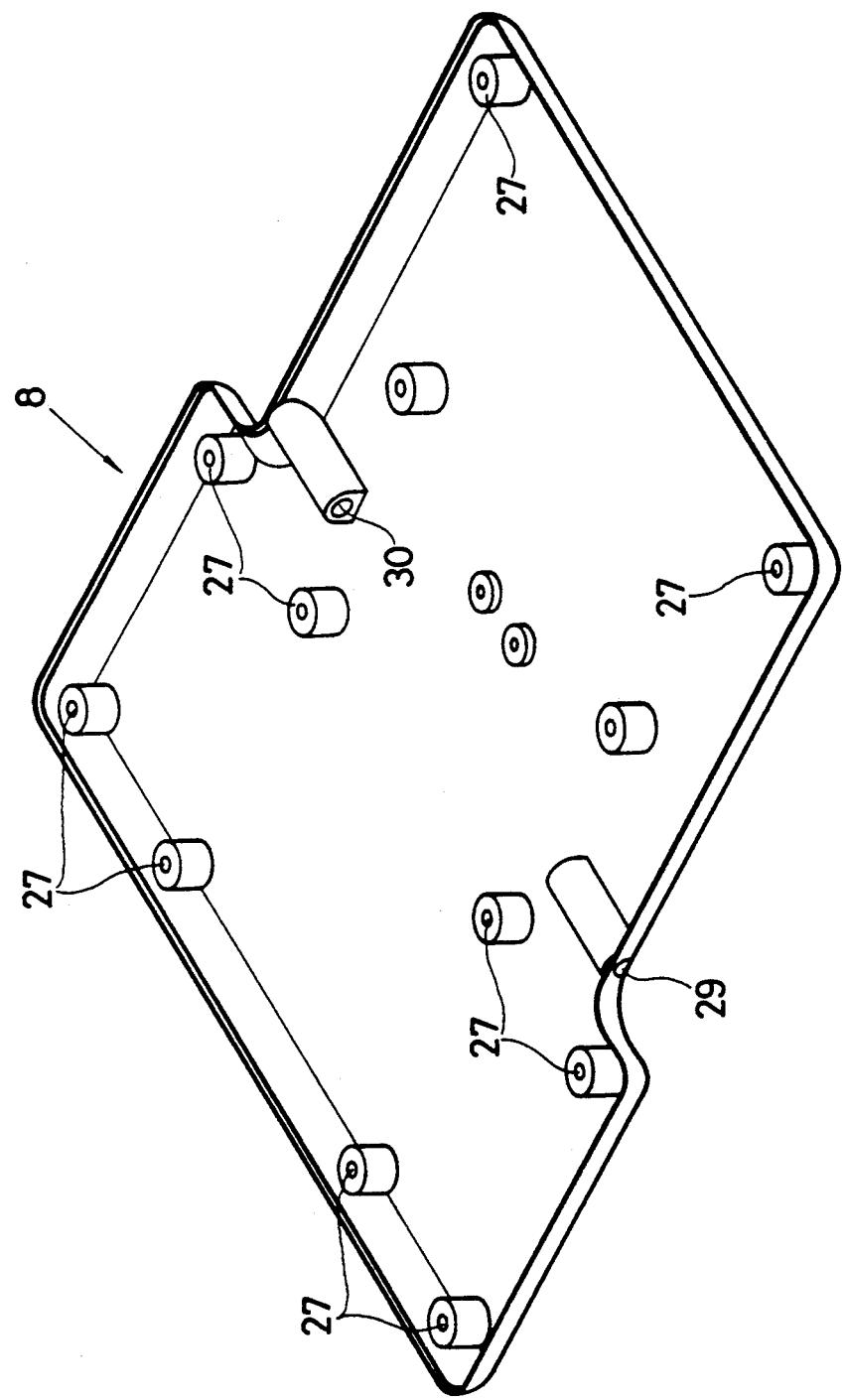

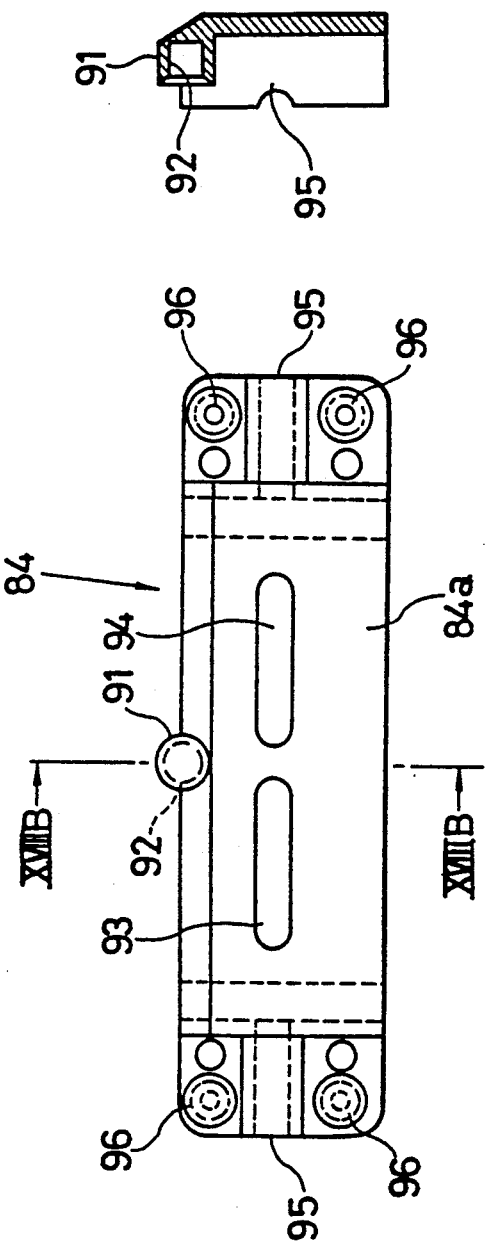

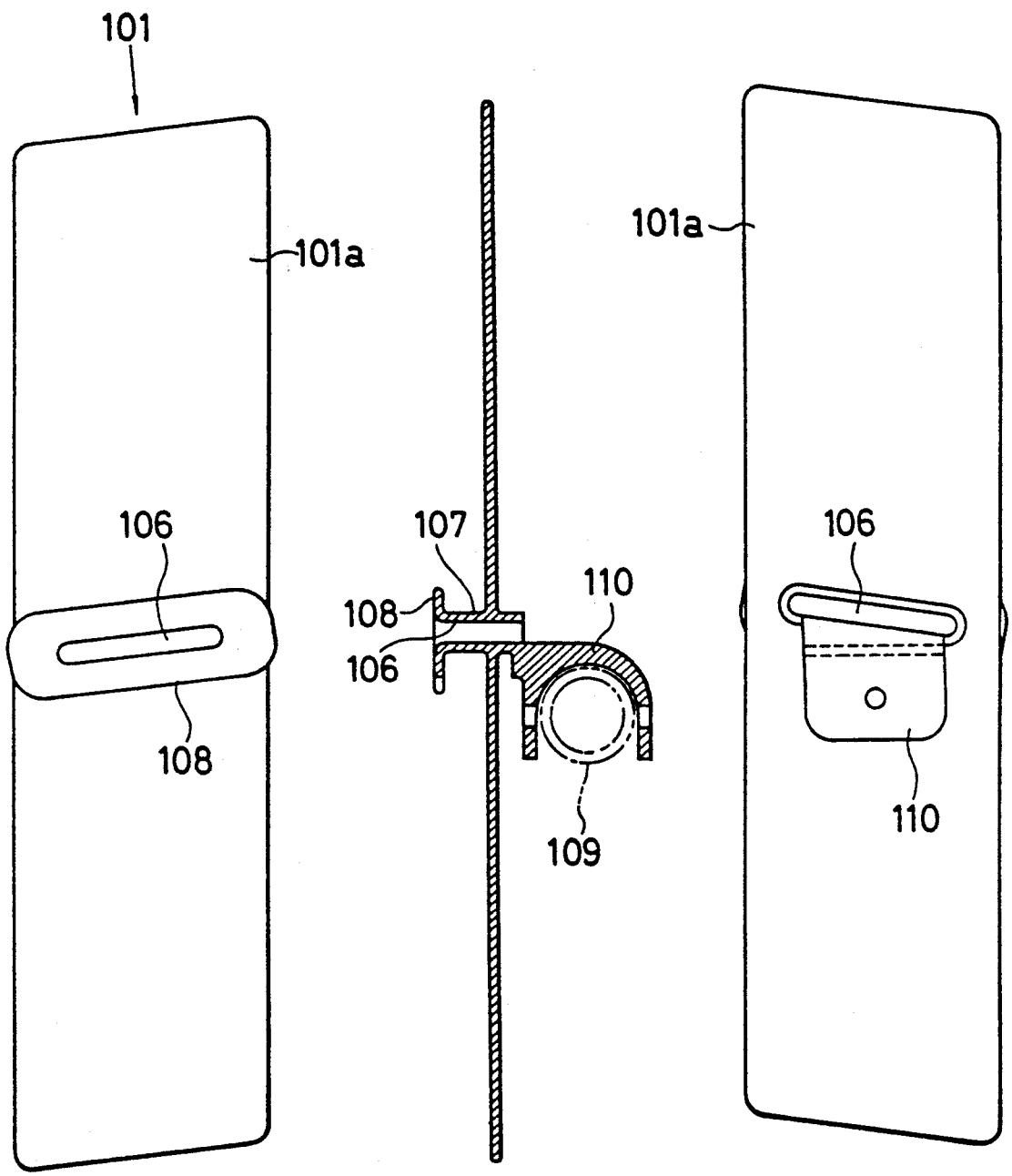

RESTRAINING PROTECTIVE SEAT FOR INFANTS

BACKGROUND OF THE INVENTION

This invention relates to an infant-restraining protective seat of the type placed upon and secured to a seat in a vehicle such as an automobile or airplane and adapted to restrain and protect a seated infant by a seat belt device for infants. More particularly, the invention relates to a shoulder-belt adjusting device for adjusting the shoulder belts of the seat belt device for infants.

In a vehicle such as an automobile or airplane, restraining protective seats for infants have been used in order to maintain the seated posture of an infant during travel and protect the infant from shock at the time of acceleration and deceleration. An infant restraining and protective seat of this kind has a reclinable seat main body reclinably attached to a base member and adapted to seat an infant, and an infant seat belt device for restraining the seated infant. The infant seat belt device has an infant seat belt, a chest-contact pad attached to the end of the infant seat belt, a tongue provided on the end of the chest-contact pad, and a buckle, provided on the seat main body, capable of holding the tongue in such a manner that the tongue can be freely engaged with and disengaged from the buckle. In a state in which the tongue is engaged with and locked by the buckle, the infant is restrained by the infant seat belt and chest-contact pad.

Since the height of the shoulders of a seated infant differs depending upon the build of the infant, the conventional infant-restraining protective seat of this type is equipped with a shoulder-belt adjusting device which, in dependence upon the build of the seated infant, adjusts the up-and-down position of the infant shoulder belts engaging the shoulders of the infant.

The conventional shoulder-belt adjusting device in common use includes a suitable number of adjusting holes, which are provided in the seat back in the longitudinal direction, through which the shoulder belts are passed. The positions of the shoulder belts are adjusted up or down by passing the shoulder belts through those adjusting holes corresponding to the build of the infant.

However, in the up-and-down adjustment of the shoulder belts by the longitudinally provided suitable number of adjusting holes, the adjustment is performed in individual steps, and therefore the shoulder belts cannot be adjusted accurately in conformity with the build of the infant.

Accordingly, a shoulder-belt adjusting device in which the positions of the shoulder belts up and down can be adjusted steplessly has been developed. The shoulder-belt adjusting device includes a belt guide for guiding the shoulder belts up and down, a screw shaft rotatably disposed on the back side of the seat back along the longitudinal direction for moving the belt guide up and down, and an operating knob disposed on the upper end of the seat back on its back side for applying a rotational torque to the screw shaft. By turning the operating knob to move the belt guide up or down, the positions of the shoulder belts can be steplessly adjusted up or down.

However, in this shoulder-belt adjusting device, the amount of projection of the infant-restraining protective seat 1 to the rear is large since the operating knob is disposed on the upper end of the seat back on the back side thereof. In particular, when the protective seat is used, the seat back assumes a reclining attitude tilted to the rear and therefore the amount of rearward projection of the upper end of the seat back is enlarged.

Thus, when the infant-restraining protective seat having this large amount of rearward projection is secured to the vehicle seat, the protective seat is situated at a considerably forward portion of the vehicle seat. As a consequence, the seated infant is too close to the parts of the vehicle in front of the vehicle seat. Moreover, owing to the fact that the protective seat is disposed on the forward part of the vehicle seat, there are cases in which the protective seat cannot be secured to the vehicle seat stably and reliably.

SUMMARY OF THE INVENTION

An object of the present invention is to provide an infant-restraining protective seat in which the amount of rearward projection of the protective seat can be made small while also making it possible to adjust the up-and-down position of infant shoulder belts in continuous fashion.

According to the present invention, the foregoing object is attained by providing an infant-restraining protective seat comprising a seat portion for seating an infant, a seat back for supporting the back of the seated infant, and an infant seat belt device for restraining and protecting the seated infant, characterized in that the seat back is provided with a shoulder-belt adjusting device, the shoulder belt adjusting device having a belt guide for guiding shoulder belts of the infant seat belt device up and down, a screw shaft disposed in the up-and-down direction and having at least its lower end supported for rotation but fixed in the axial direction for moving the belt guide up and down, a torque link, which has its one end connected to the screw shaft and its other end arranged so as to perpendicularly intersect the axial direction of the screw shaft, for transmitting rotational torque to the screw shaft, and an operating knob provided on either the left or right side of the seat back and having the other end of the torque link connected thereto for applying the rotational torque to the torque link.

In the infant-restraining protective seat constructed as set forth above, turning the operating knob transmits the rotational torque thereof to the screw shaft, as a result of which the screw shaft turns. Since the belt guide is moved up or down continuously by this rotation of the screw shaft, the shoulder belts are adjusted up or down in stepless fashion.

The operating knob is provided on either the left or right side of the seat back. Accordingly, the amount of rearward projection of the protective seat attributed to the operating knob is reduced. Moreover, since the operating knob is provided on the lower portion of the seat back, the influence of the operating knob upon the amount of rearward projection of the protective seat is almost nil even when the seat back is tilted by being reclined. As a result, the amount of rearward projection of the protective seat is reduced even further. Further, since the lower end of the screw shaft is supported so as to be fixed in the axial direction, the up-and-down force from the shoulder belts is borne, via the screw shaft, by a bearing portion supporting the lower end of the screw shaft. This makes it necessary to enlarge the bearing portion in order to provide it with sufficient strength. Since the bearing portion is arranged so as to be situated at the lower portion of the seat back, the fact that the bearing portion is formed to be large in size has almost no affect upon the amount of rearward projection of the protective seat when the protective seat is in the backwardly tilted state. Accordingly, the amount of rearward projection of the protective seat can be reduced irrespective of the bearing portion.

Still other objects and advantages of the invention will in part be obvious and will in part be apparent from the specification.

The invention accordingly comprises the features of construction, combinations of elements and arrangement of parts which will be exemplified in the construction hereinafter set forth, and the scope of the invention will be indicated in the claims.

BRIEF DESCRIPTION OF THE DRAWINGS

FIG. 8 is a perspective view showing a base portion in this embodiment;

FIG. 18 illustrates a pin cover of the seat-back tilting control device, in which (a) is a front view thereof and (b) a sectional view taken along line XXIB—XXIB in (a);

FIG. 22 illustrates a belt guide in a shoulder-belt adjusting device of this embodiment, in which (a) is a front view, (b) a sectional view taken along line XVB—XVB in (a), and (c) a back view.

DESCRIPTION OF THE PREFERRED EMBODIMENT

An embodiment of the present invention will now be described with reference to the drawings.

Figure 1:
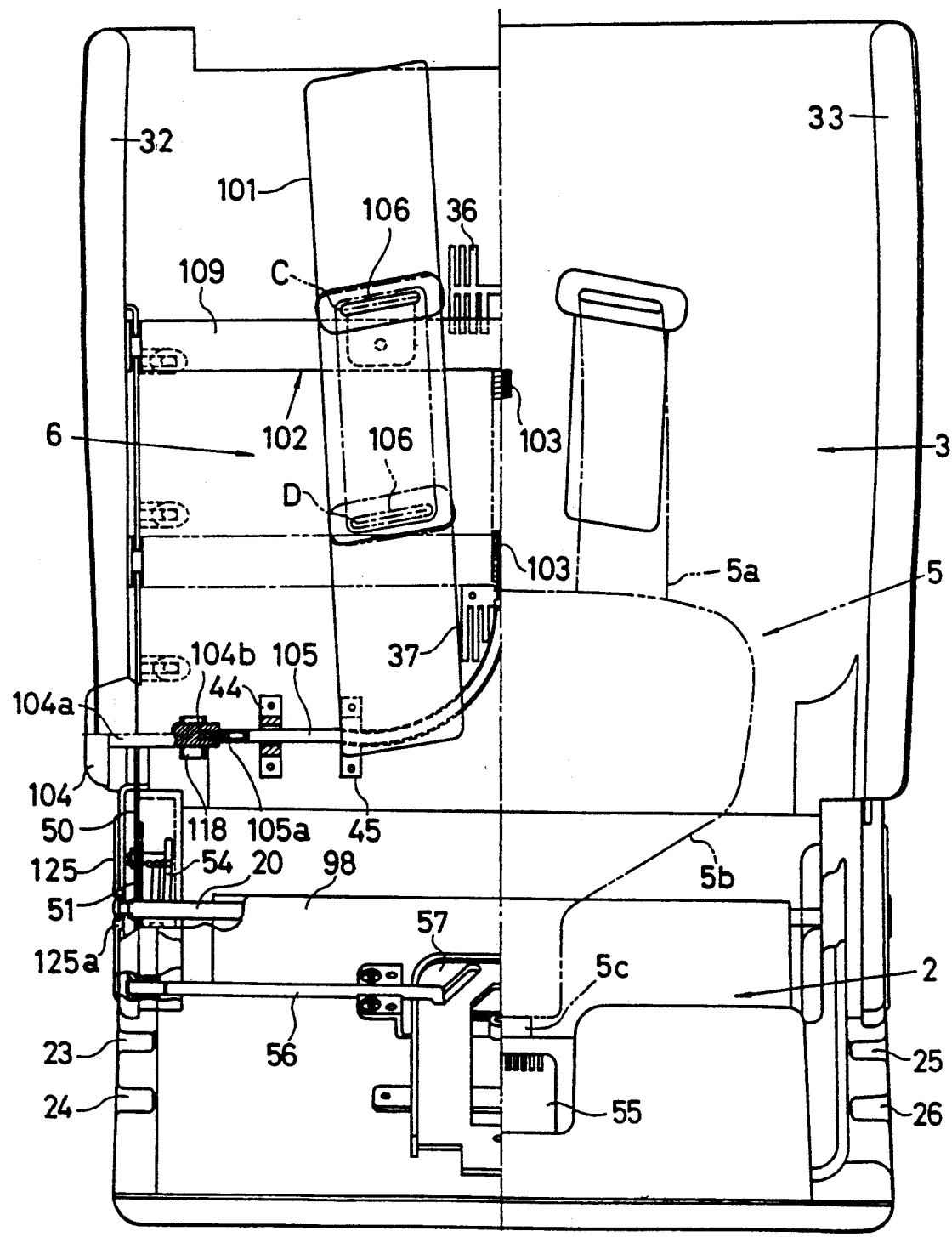
FIG. 1 is a front view showing an embodiment of an infant-restraining protective seat according to the present invention, in which the left half of the seat has been cut away.
Figure 2:
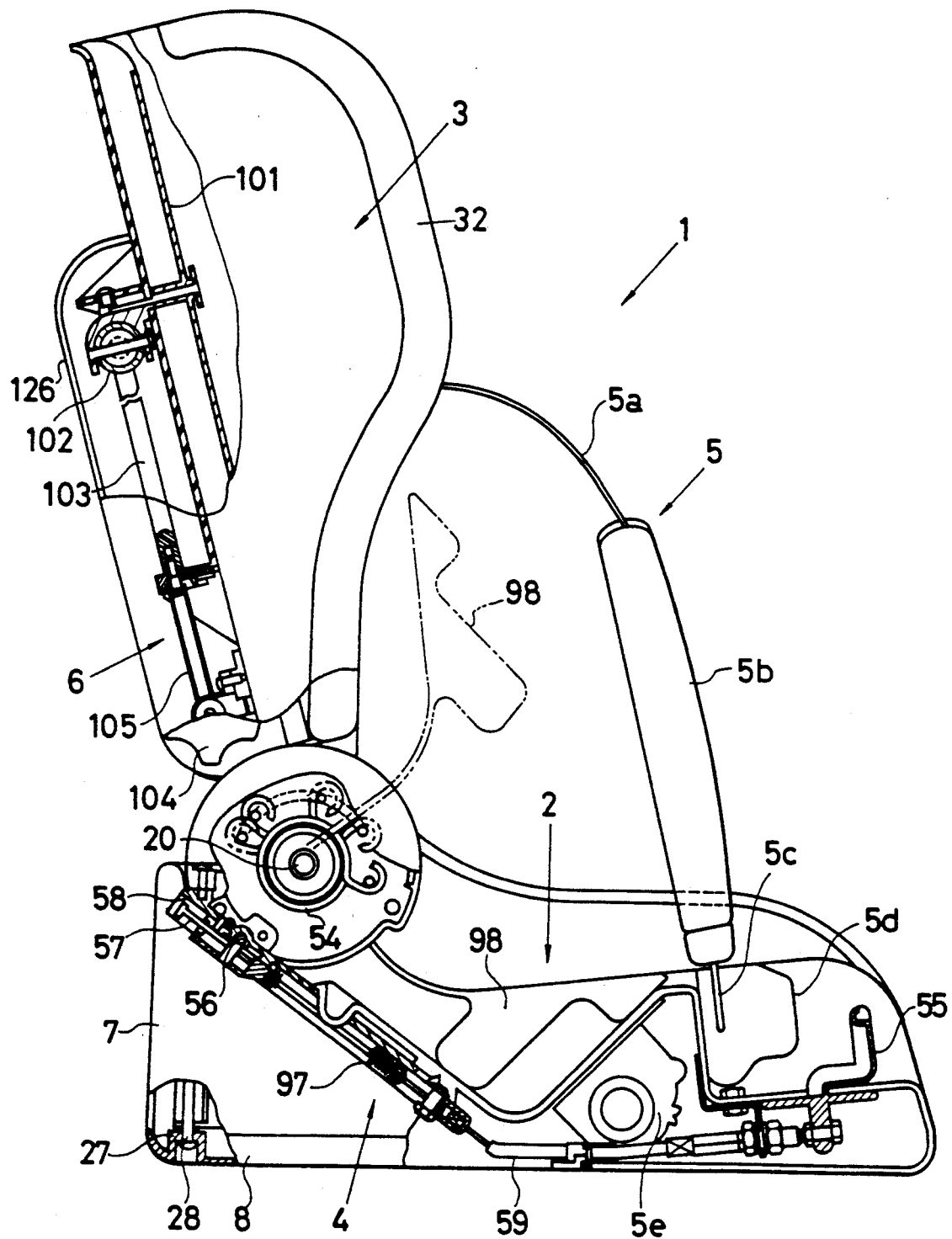
FIG. 2 is a side view showing this embodiment with a portion thereof cut away.
Figure 3:
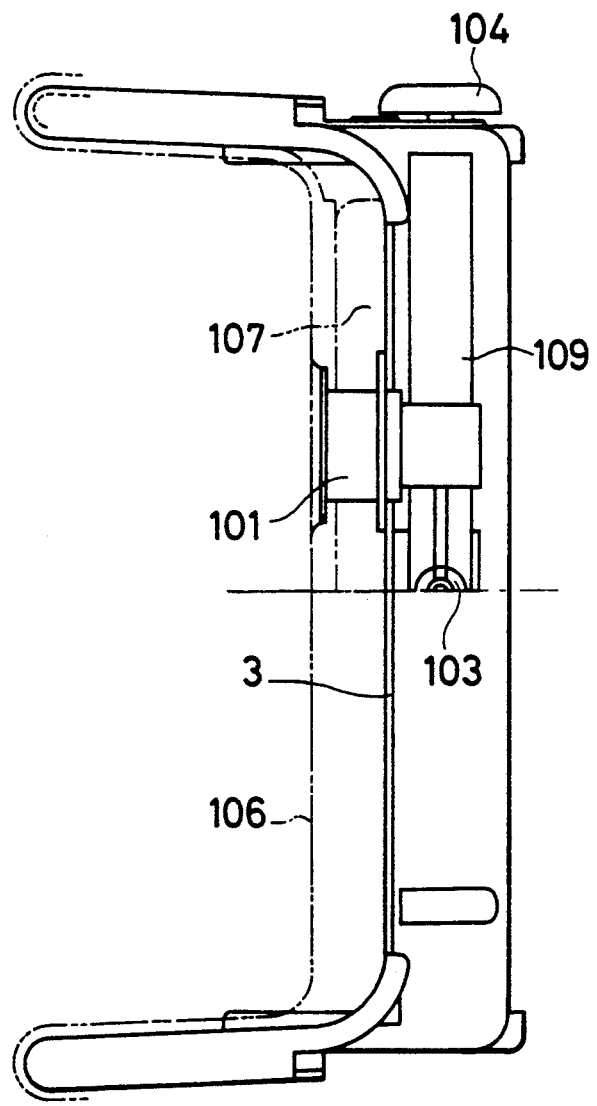
FIG. 3 is a plan view showing this embodiment with a portion thereof cut away.

As illustrated in FIGS. 1 through 3, an infant-restraining protective seat 1 according to the embodiment of this invention includes a seat portion 2 for seating an infant, a seat back 3 tiltably attached to the seat portion 2 for supporting the back of the infant, a seat-back tilting control device 4 for controlling tilting of the seat back 3, an infant seat belt device 5 for restraining the infant seated on the seat portion 2, and a shoulder-belt adjusting device 6 for adjusting the up-and-down position of a shoulder belt 5a in the infant seat belt device 5.

Figure 4:
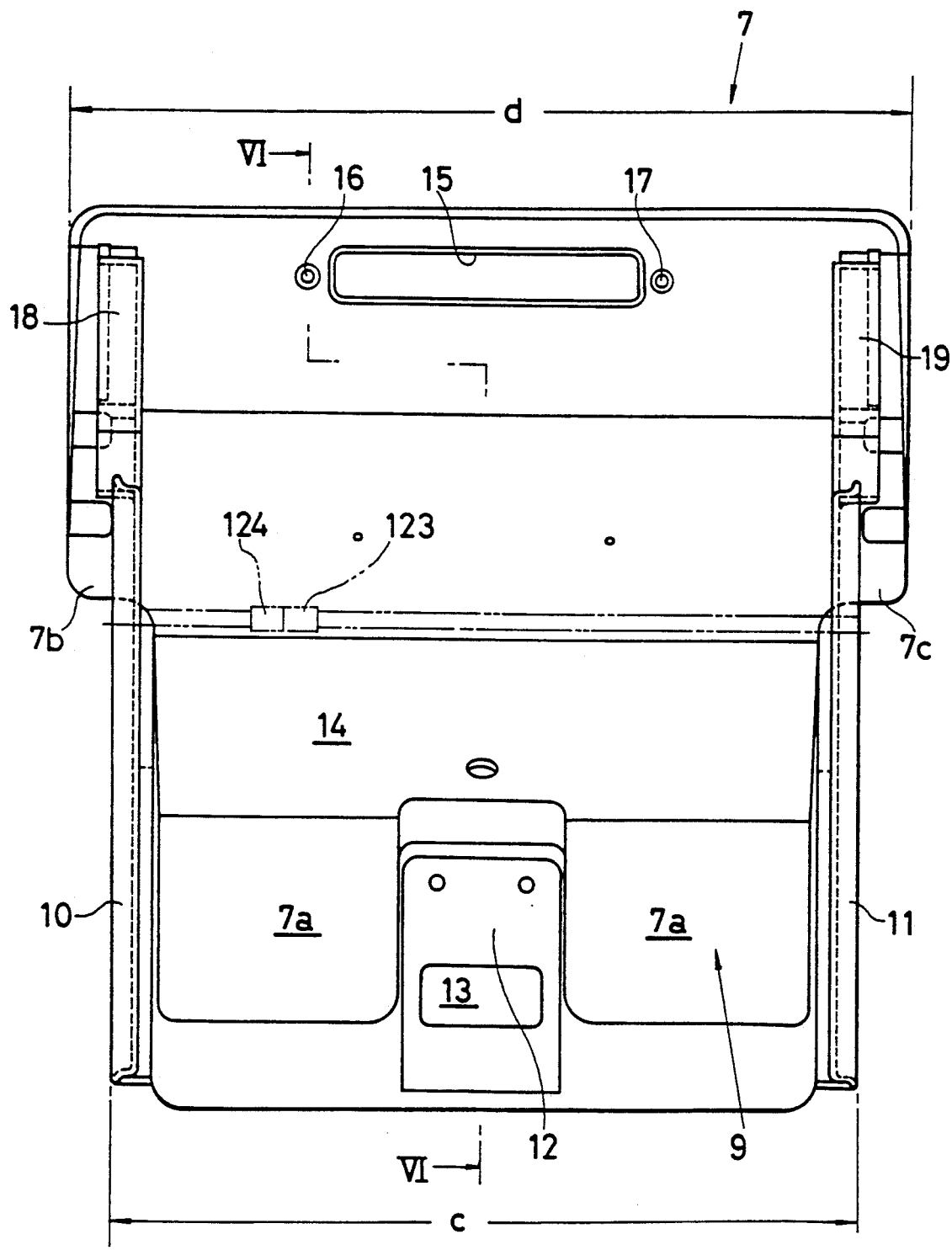
FIG. 4 is a plan view showing the main body of a seat portion in this embodiment.
Figure 5:
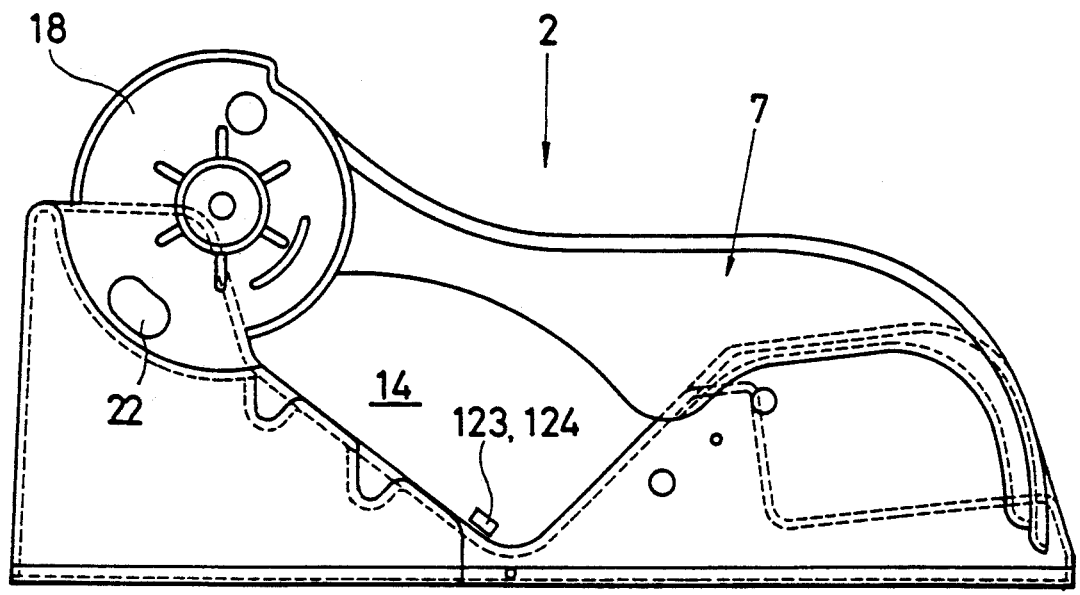
FIG. 5 is a side view showing the main body of the seat portion.
Figure 6:
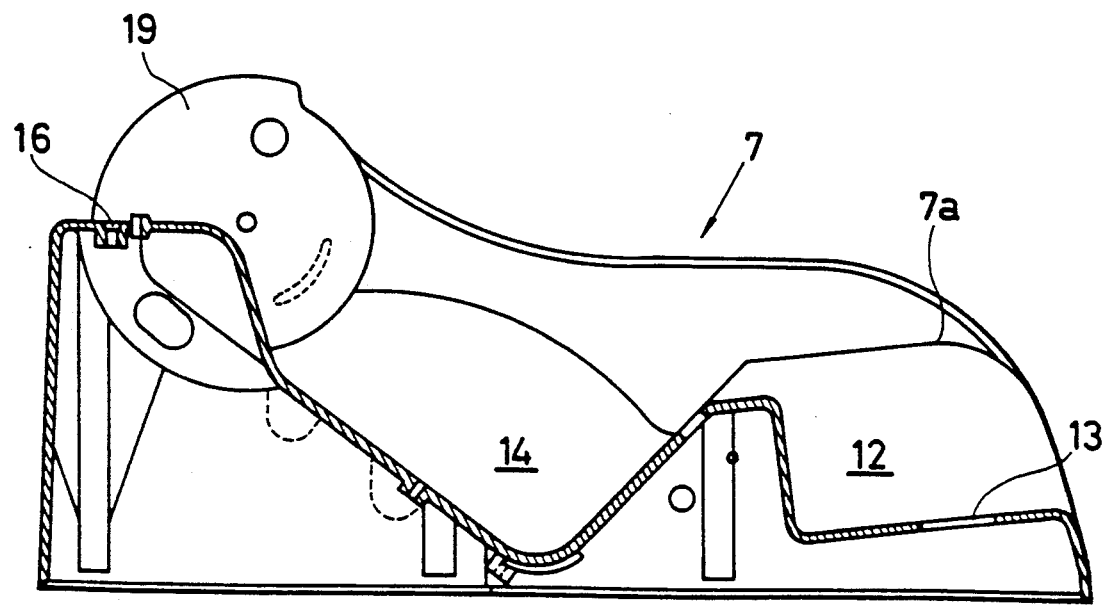
FIG. 6 is a sectional view of the main body of the seat portion taken along line VI—VI in FIG. 4.
Figure 7:
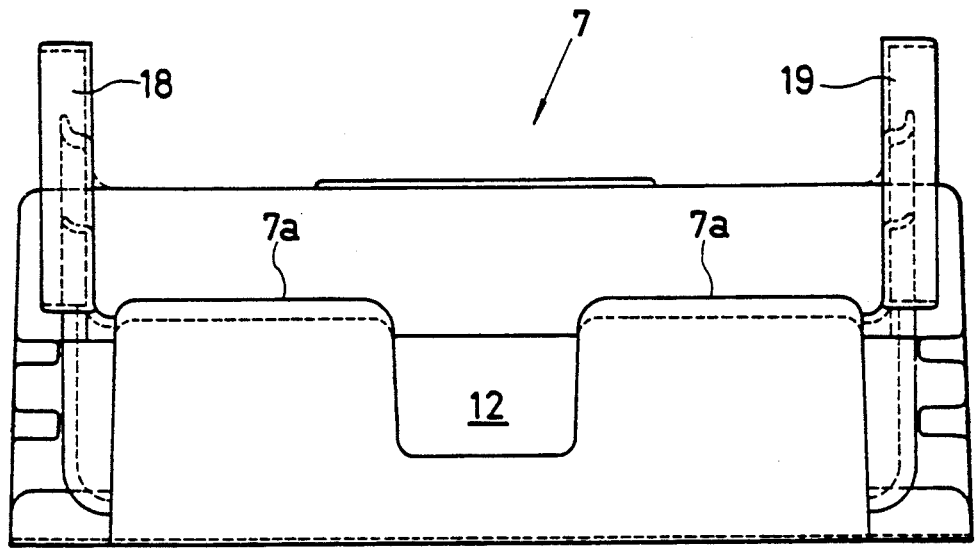
FIG. 7 is a front view showing the main body of a seat portion.

The seat portion 2 comprises a seat-portion body 7 and a base portion 8 supporting the seat-portion body 7. As illustrated in FIGS. 4 through 6, the seat-portion body 7 is constituted by a central portion 9 which directly seats the infant, and left and right side walls 10, 11 formed respectively on the left and right sides of the central portion 9. These components are formed as a unitary body consisting of a plastic shell. Formed in the forward part of the central portion 9 is a first recess 12 for accommodating a buckle 5d of the infant seat belt device 5, described later, and an operating lever 55 of the seat-back tilting control device 4, also described later. The first recess 12 is formed to have a guide hole 13 through which the operating lever 55 of the seat-back tilting control device 4 is passed. The guide hole 13 makes it possible for the operating lever 55 to be moved back and forth.

Formed across the middle of the central portion 9 in terms of the longitudinal direction thereof is a second recess 14 having a V-shaped cross section. As will be set forth later, the arrangement is such that a tongue 123 and buckle 124 of a passenger-restraining seat belt device installed at a vehicle seat 122 of a vehicle such as an automobile or airplane and used also for securing the infant-restraining protective seat 1 to the vehicle seat are situated within the second recess 14. Further, the rear part of the central portion 9 is provided with an infant seat-belt through-hole 15 through which the infant seat belt of the infant seat belt device 5 is passed, and with a pair of mounting screw holes 16, 17, which bracket the through-hole 15, through which screws for attaching a case 58 (the details of which will be described later) of the seat-back tilting control device 4 are passed.

The rear portions of the left and right side walls 10, 11 are formed to have respective turning support portions 18, 19, of substantially circular shape, at which turning portions of the control device 4 are supported. The turning support portions 18, 19 are provided at their centers with a turning-shaft through-hole 21 through which a turning shaft 20 for rotatably supporting the seat back 3 is passed, and at their rearward lower portions with a locking-pin through-hole 22 through which a locking pin 56 (the details of which will be described later) of the control device 4, which pin is for locking the seat back 3 at a set predetermined angular position, is passed.

As illustrated in FIG. 8, the base portion 8 also is formed of a plastic shell and is formed to have a prescribed number of mounting holes 27 into which screws for attaching the seat-portion body are tightly screwed. As shown in FIG. 2, the seat-portion body 7 is attached to a mounting portion 27 on the base portion 8 by means of screws 28.

Figure 11:
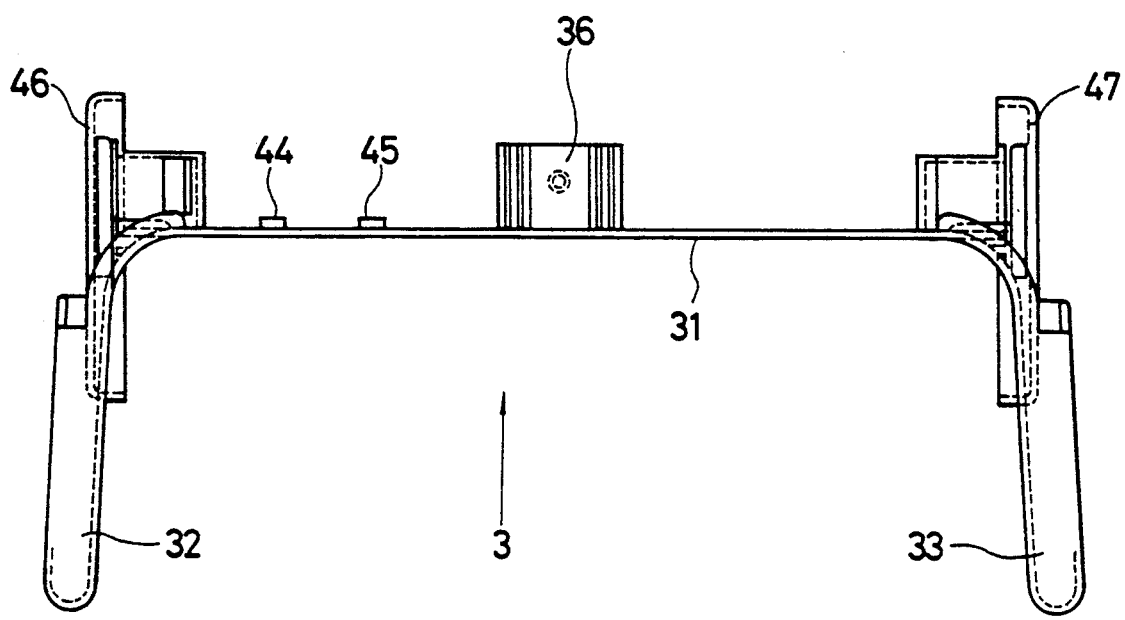
FIG. 11 is a top view of the seat back.
Figure 9:
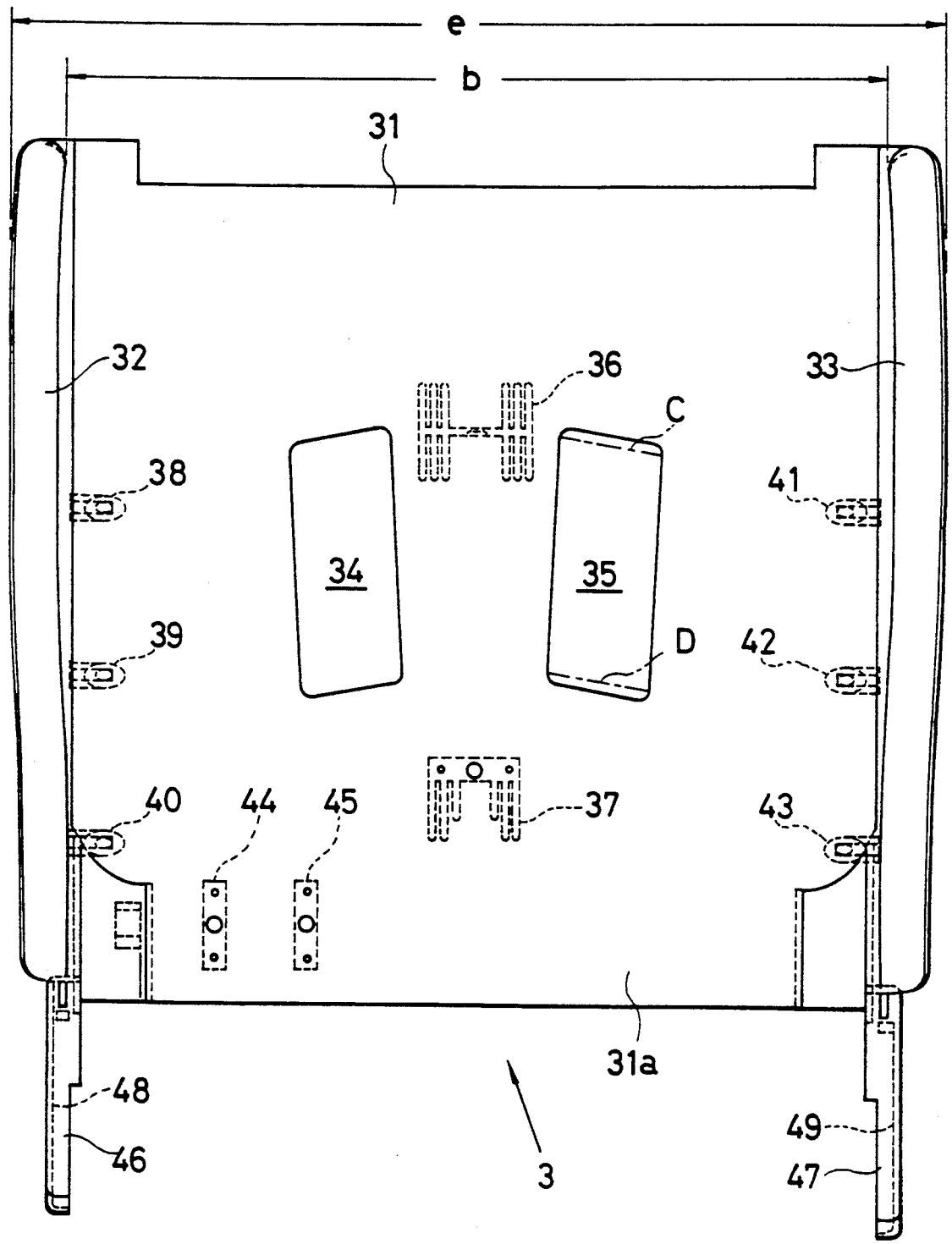
FIG. 9 is a front view showing a seat back in this embodiment.
Figure 10:
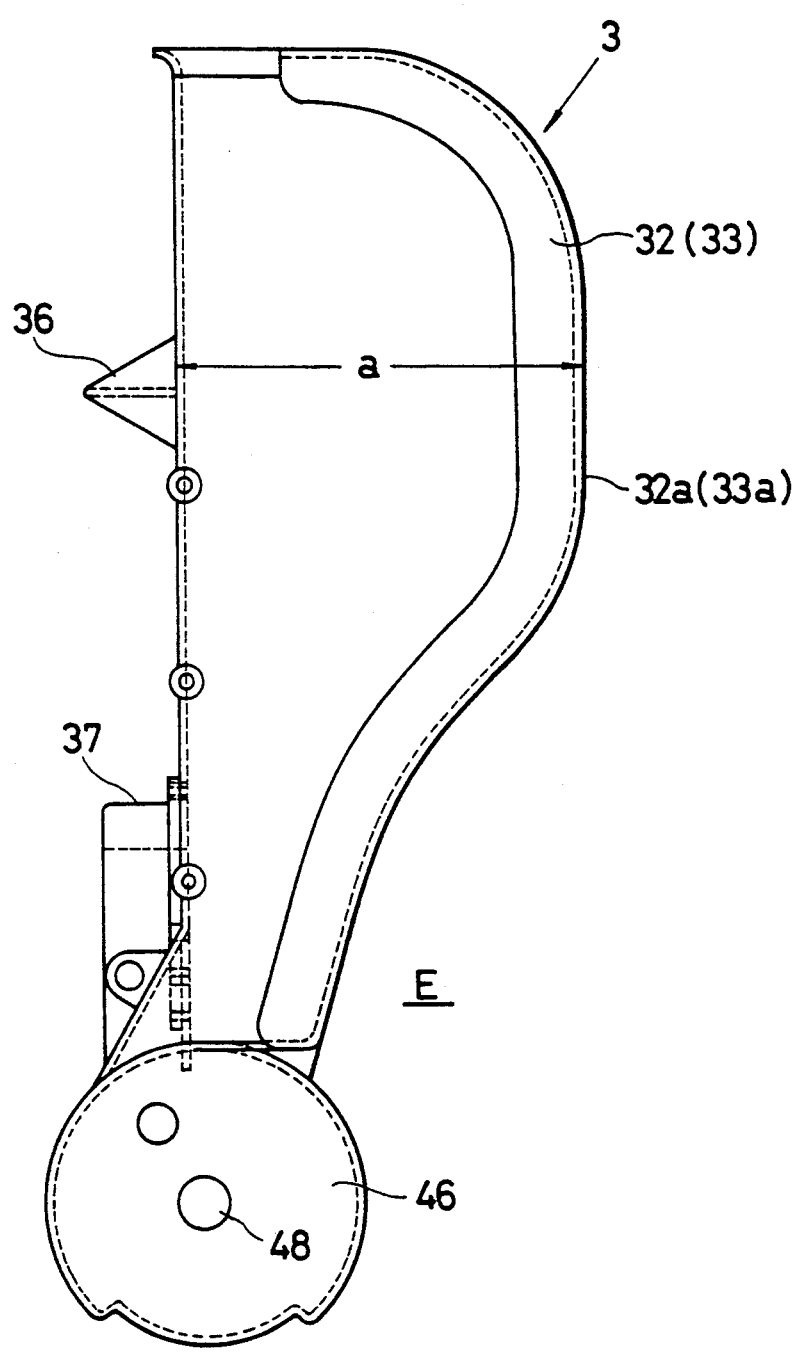
FIG. 10 is a side view of the seat back.

As shown in FIGS. 9 through 11, the seat back 3 is constituted by a seat back portion 31 which directly supports the back of the seated infant, and left and right side walls 32, 33 provided respectively on the right and left sides of the seat back portion 31. These also consist of a plastic shell. The central portion of the seat back 31 is provided with a pair of vertically extending guide holes 34, 35 each having the shape of parallelogram. A cylindrical portion 107 of a guide constituting the belt guide 101 (the details of which will be described later) in the shoulder-belt adjusting device 6 is passed through the guide holes 34, 35. The arrangement is such that the belt guide 101 may be moved up and down while being guided in the guide holes 34, 35.

The back side of the seat back portion 31 on the side of the seat back 3 opposite that which supports the infant is integrally provided with a pair of brackets 36, 37, one above the other, which freely rotatably support a screw rod 103 (shown in FIGS. 1 and 2) in the shoulder-belt adjusting device 6. Furthermore, the left and right side walls 32 and 33 at portions near the seat back portion 31 are provided respectively with mounting portions 38, 39, 40 and 41, 42, 43 into which screws for attaching an upper bracket 50 (the details of which will be described later) of the seat-back tilting control device 4 are tightly screwed. Further, the back side of the seat back portion 31 is provided with brackets 44, 45 which laterally support a torque link 105 (illustrated in FIGS. 1 and 2) in the shoulder-belt adjusting device 6.

The lower ends of the left and right side walls 32, 33 are formed to have respective turning support portions 46, 47, of substantially circular shape, in which turning portions of the seat-back control device 4 are accommodated and supported. The turning support portions 46, 47 are centrally provided with respective through-holes 48, 49 into each of which a projecting portion 125a on the central portion of a rotating shaft cover 125 (shown in FIG. 1), described later, is inserted.

As illustrated in FIGS. 1 and 2, the seat-back tilting control device 4 includes left and right upper brackets 50 attached respectively to the left and right side walls 32, 33, left and right lower brackets 51 attached respectively to the left and right side walls 10, 11 of the seat-portion body 7, a torsion spring 54 interposed between an upper hook pin 52 attached to the upper bracket 50 and a lower hook pin 53 attached to the lower bracket 51, an operating lever 55, the locking pin 56, a cam plate 57 for controlling movement of the locking pin 56 between a locking position and an unlocking position, a case 58 for slidably accommodating and supporting the locking pin 56 and the cam plate 57, a biasing spring 97 for constantly biasing the cam plate 57 in such a direction that the locking pin 56 assumes the locking position, and an operating-force transmitting link 59 connected between the operating lever 55 and the cam plate 57 for transmitting the operating force of the operating lever 55 to the cam plate 57 against the biasing force of the biasing spring 97.

Figures 12A, 12B:
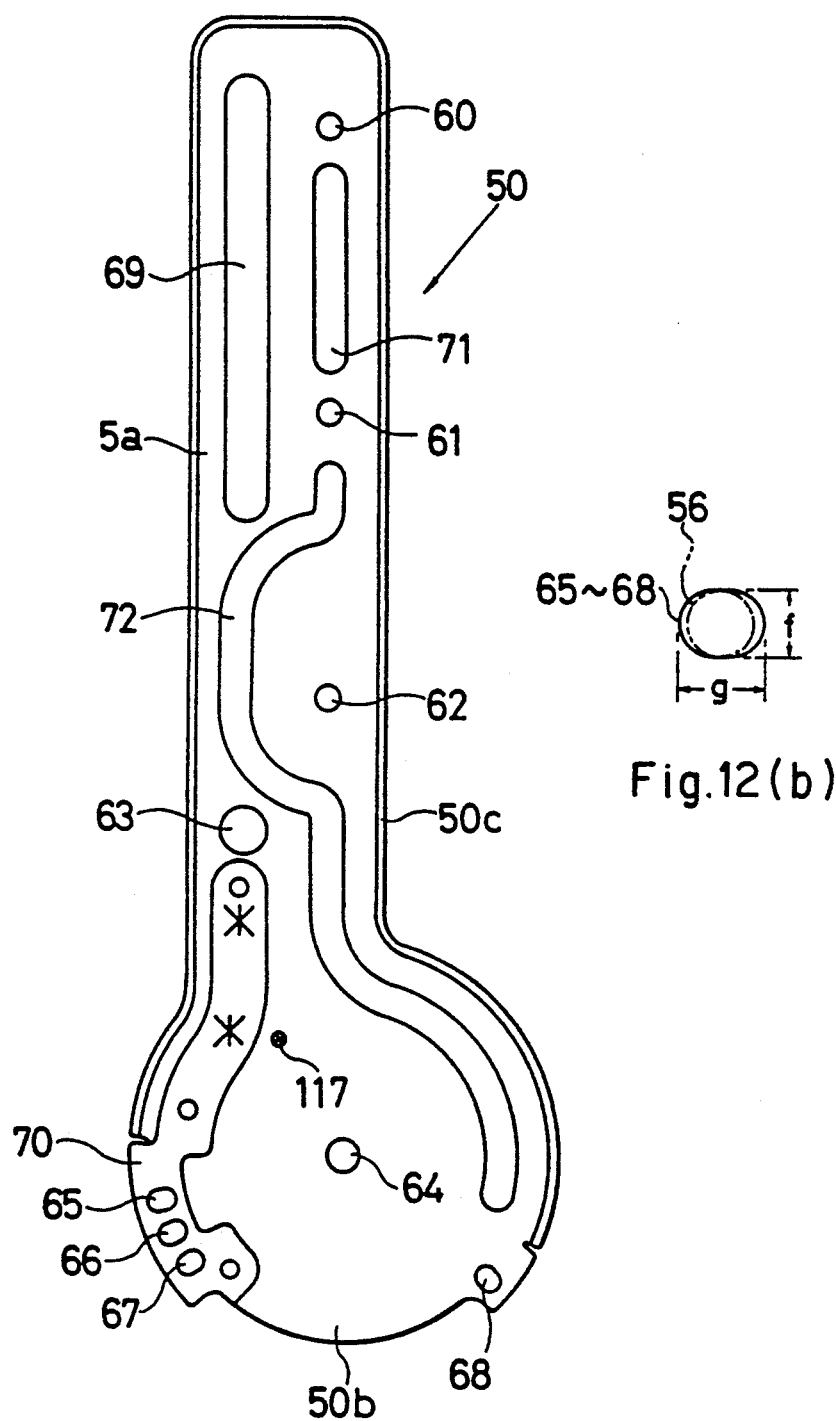
FIG. 12 illustrates an upper bracket in this embodiment, in which (a) is a plan view thereof and (b) an enlarged view of a locking hole.

As illustrated in FIG. 12, the upper bracket 50 has the shape of a flat plate and is constituted by an upper rectangular portion 50a and a lower circular portion 50b. The rectangular portion 50a is provided with three vertically aligned screw holes 60, 61, 62 through which screws for attaching the upper bracket 50 to the seat back are passed. Further, the rectangular portion 50a is provided with a through-hole 63 through which a turning shaft 104a of an operating knob 104 (shown in FIG. 1) of the shoulder-belt adjusting device 6 is passed so as to be capable of turning.

The circular portion 50b is provided with a hole 64 through which the turning shaft 20 is passed so as to be capable of turning relative the circular portion. Further, in order that the seat back 3 may be locked at any of three reclining angles, three locking holes 65, 66, 67 through which the locking pin 56 is passed are formed in the circular portion 50b on the circumference of a circle of a prescribed radius from the center of the hole 64. In order to lock the seat back 3 at the folded position, the circular portion 50b is provided with a locking hole 68, located on the same circumference as the locking holes 65, 66, 67, through which the locking pin 56 is passed. As shown in (b) of FIG. 12, each of the locking holes 65, 66, 67, 68 is elliptical in form, with the ellipse having a minor axis f and a major axis g. In this case, the minor axis f is set to have a size that allows the locking pin 56 to be passed through and slid along the hole with almost no gap between the pin 56 and the walls of the hole. Further, the locking holes 65, 66, 67, 68 are so arranged that the minor axis f of each hole lies in the circumferential direction of a circle concentric with the hole 64 while the major axis g of each hole lies in the diametric direction of the circle concentric with the hole 64. The circular portion 50 is further provided with a longitudinally extending guide slot 69. When guides 113, 114 of supporting means 102 (shown in FIG. 22) supporting the belt guide 101 move up and down, screw portions 113b, 114b of the respective guides 113, 114 are guided by the guide slot 69. The circular portion 50b is further provided with a hole 117 through which the upper hook pin 52 is passed and secured.

The portion in which the locking holes 65, 66, 67 for locking the seat back 3 at a prescribed reclining angle are formed is reinforced by a reinforcing member 70. The upper bracket 50 is formed to have a flange 50c along the edge of parts of the rectangular portion 50a and circular portion 50b. The rectangular portion 50a and circular portion 50b are formed to have reinforcing ribs 71, 72 by bending. The upper bracket 50 is reinforced by the reinforcing ribs 71, 72.

As illustrated in FIG. 1, the upper bracket 50 is secured to the seat back 3 by passing screws through the screw holes 60, 61, 62 and screwing them into the mounting holes 38, 39, 40 of the seat back 3. With each upper bracket 50 thus secured to the seat back 3, play in the lateral direction is prevented.

Figure 13A:
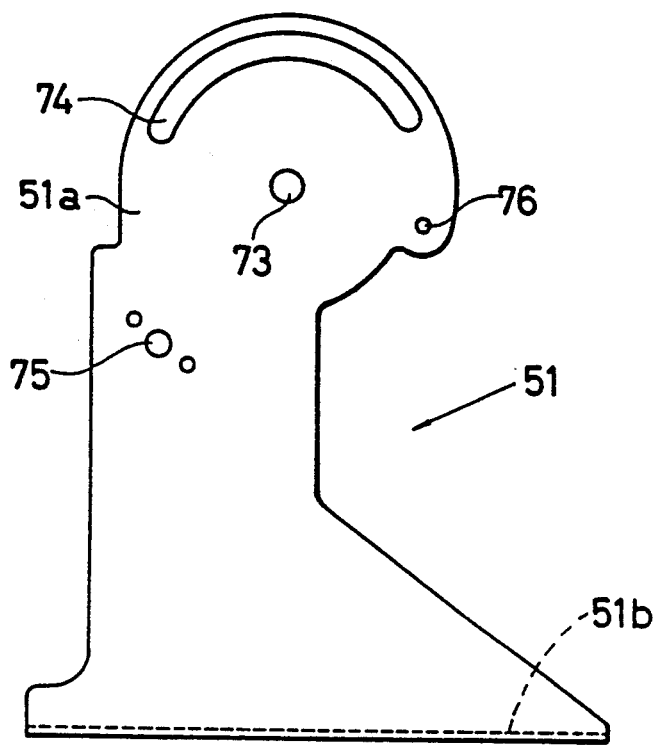
FIG. 13 illustrates a lower bracket in this embodiment, in which (a) is a front view thereof and (b) a plan view.
Figure 13B:
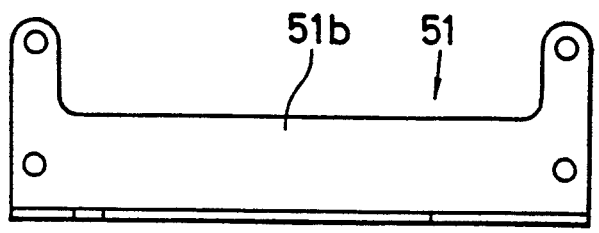

As shown in (a) and (b) of FIG. 13, the lower bracket 51 is formed to have a semicircular portion 51a on its upper part, while its lower part is formed to have a mounting portion 51b fastened to the seat-portion body 7 by screws. The semicircular portion 51a has a centrally provided circular hole 73 through which the turning shaft 20 is passed. The semicircular portion 51a is further provided with a guide slot 74 along an arc concentric with the hole 73. The upper hook pin 52 is passed through the guide slot 74 and is turnably guided thereby when the seat back 3 is tilted. The lower bracket 51 includes also a hole 75 through which the locking pin 56 is slidably passed, and a hole 76 through which the lower hook pin 53 is passed and secured. In this case, the through-hole 75 is provided at such a position that the length of a line between the center of the hole 75 and the center of the hole 73 will be equal to the radius of the circle, which is centered on the hole 64, on which the locking holes 65, 66, 67 of upper bracket 50 are provided. The upper bracket 50 is secured to the seat-portion body 7 by screws (not shown).

As illustrated in FIG. 1, the turning shaft 20 is passed through the hole 73 of the lower bracket 51, which is secured to the seat-portion body 7, and is supported on the lower bracket 51, and the upper bracket 50 secured to the seat back 3 is situated on the outer side of the lower bracket 51 and is tiltably supported by passing the turning shaft 20 through the hole 64. In this case, the upper bracket 50 is prevented from falling off the turning shaft 20 by a retaining ring 77. A cover 78 of the turning shaft 20 is attached so as to cover the turning shaft 20 by fitting a projection 78a of the cover 78 into the through-hole 48 of the seat back 3 and screwing a screw into the end portion of the turning shaft 20. The upper hook pin 52 secured to the upper bracket 50 is passed through the guide slot 74 so as to extend to inner side of the lower bracket 51 and is situated between the turning support portions 18, 19 of the seat-portion body 7. In addition, the torsion spring 54 is interposed between the upper hook pin 52 and the lower hook pin 53 secured to the lower bracket 51. Thus, the seat back 3 is attached to the seat-portion body 7 so as to be capable of tilting about the turning shaft 20. In this case, one of the locking holes 65, 66, 67, 68 of the upper bracket 50 registers with the through-hole 75 of the lower bracket 51 depending upon the angular position to which the seat back 3 has been tilted.

Figures 14A, 14B:
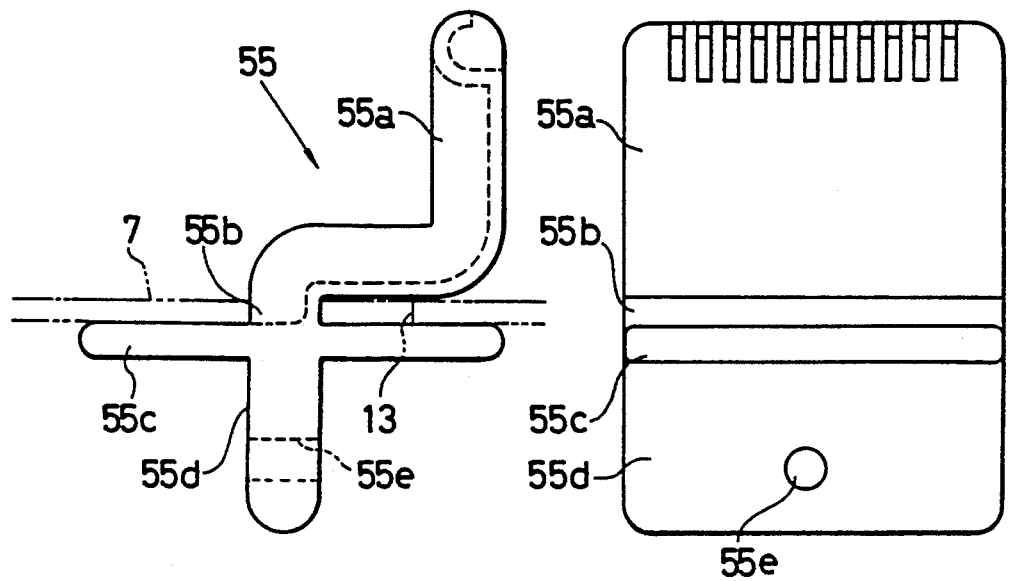
FIG. 14 illustrates an operating lever of a seat-back tilting control device in this embodiment, in which (a) is a side view thereof and (b) a front view.

As shown in FIG. 14, the operating lever 55 includes an operating portion 55a arranged in the recess 12 of the seat-portion body 17 for actuating the operating lever 55, a penetration portion 55b which is passed through the guide hole 13, a support portion 55c for slidably supporting the operating lever 55 on the seat-portion body 17, and a connection portion 55d to which the operating-force transmitting link 59 is connected. The connecting portion 55d is provided with a hole 55e for fixing the link 59 that has been passed through the hole 55e.

Figure 15:
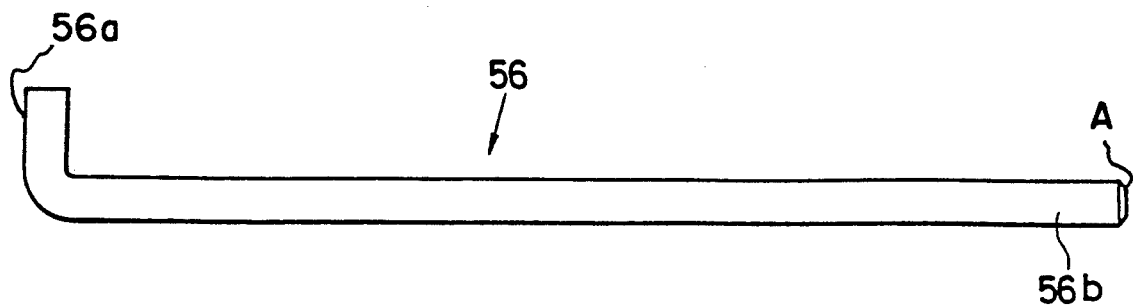
FIG. 15 is a view showing a locking pin in this embodiment.
Figure 16A:
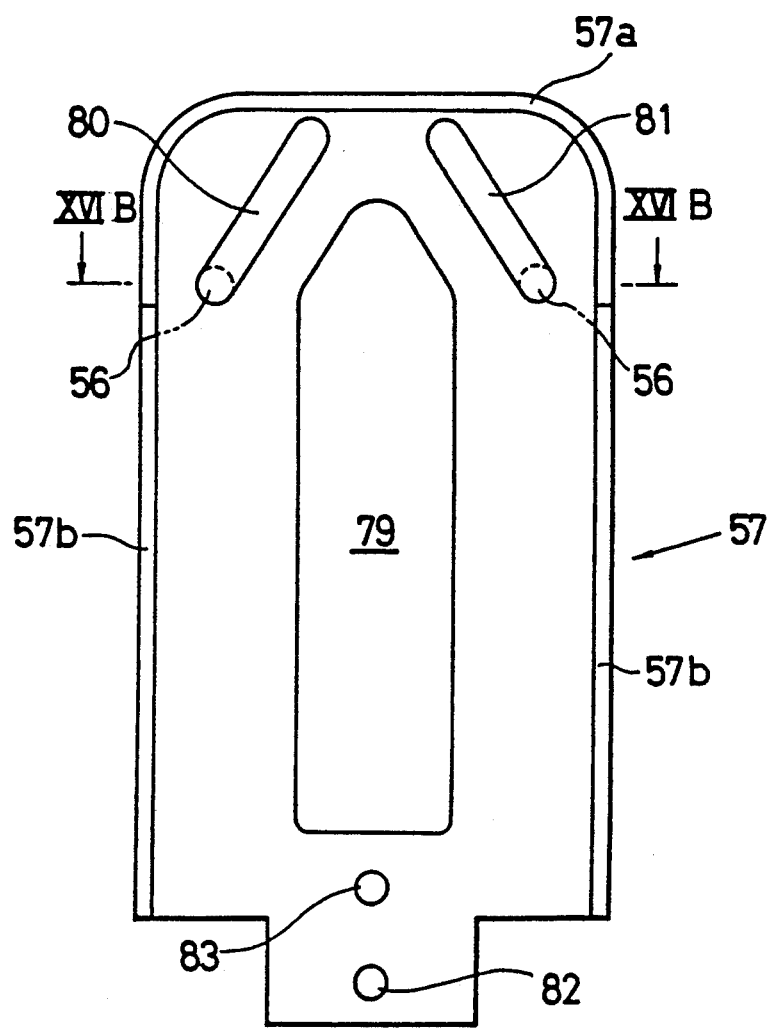
FIG. 16 illustrates a cam plate of the seat-back tilting control device in this embodiment, in which (a) is a plan view thereof and and (b) a sectional view taken along line XIXB—XIXB in (a)

As shown in FIG. 15, the locking pin 56 is formed from a round bar, one end of which is formed to have a cam follower 56a bent at a right angle. The cam follower 56a is fitted into cam slots 80, 81 (shown in FIG. 16) of the cam plate 57 and is moved by movement of the cam plate 57 while being guided by the cam slots 80, 81. The other end of the locking pin 56 is formed to have a locking portion 56b. Owing to movement of the locking pin 56 while it is being guided by the cam slots 80, 81, the locking portion 56b is passed through one of the locking holes 65, 66, 67, 68 of the upper bracket 50 and the through-hole 75 of the lower bracket 51 so as to lock the upper bracket 50 and the lower bracket 51. In this case, the other end of the locking pin 56 is provided with a chamfer A The locking portion 56b is passed through the locking holes 65, 66, 67, 68 and the through-hole 75 more easily by virtue of the chamfer A.

Figure 16B:
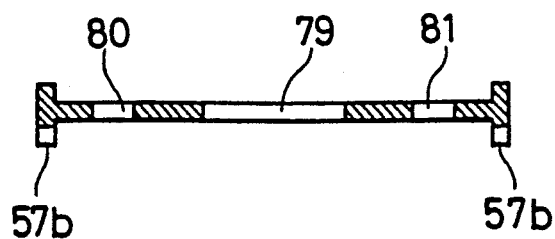

As illustrated in FIG. 16, the cam plate 57 is formed substantially as a flat plate having a centrally provided comparatively large hole 79 extending in the longitudinal direction. In cam plate 57 as it appears in FIG. 16, the upper edge is formed to have the pair of cam slots 80, 81, which diverge from each other from the top down, into which the cam follower 56a of the locking pin 56 is inserted. The lower end of the cam plate 57 is provided with a hole 82 to which one end of the operating-force transmitting link 59 is connected, and with a hole 83 to which one end of the biasing spring 97 (shown in FIG. 2), which biases the cam plate 57 upward at all times as seen in FIG. 16, is connected. The left and right side edges and the upper edge of the cam plate 57 are formed to have a flange 57a. In particular, the flange portions of flange 57a that are formed on the right and left side edges of the cam plate 57 serve as guide portions 57b which come into abutting contact with a guiding surface 58d (shown in FIG. 17) of the case 58 so as to guide the cam plate 57 along this guiding surface.

Figure 17B:
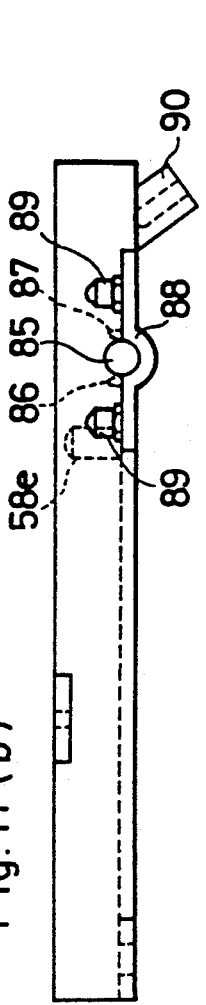
FIG. 17 illustrates the case of the seat-back tilting control device, in which (a) is a plan view thereof, (b) a plan view and (c) a side view.
Figure 17A:
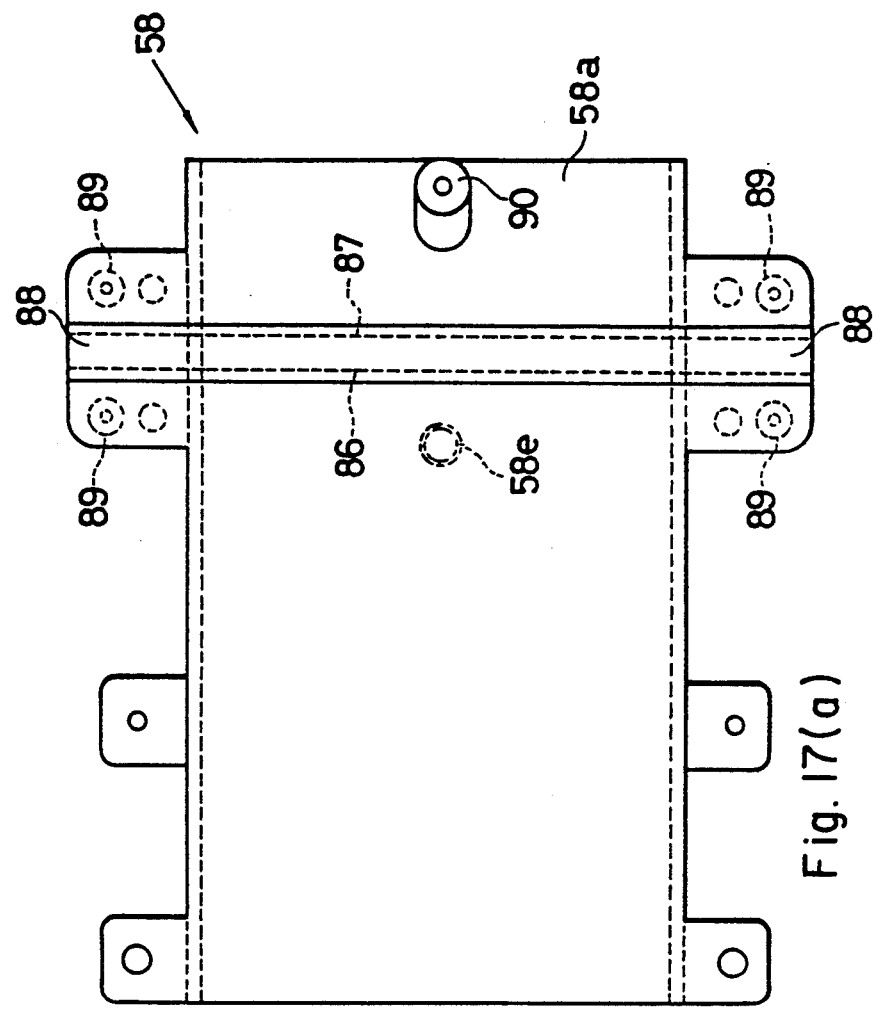
Figure 17C:
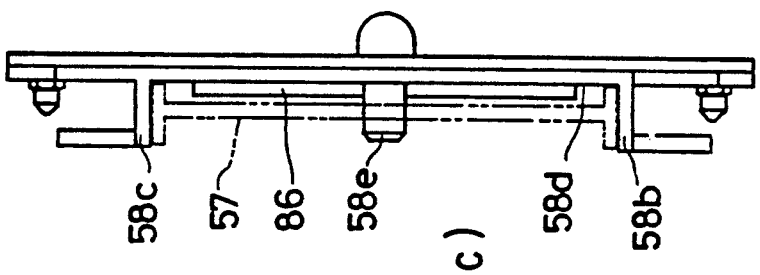
Figure 19:
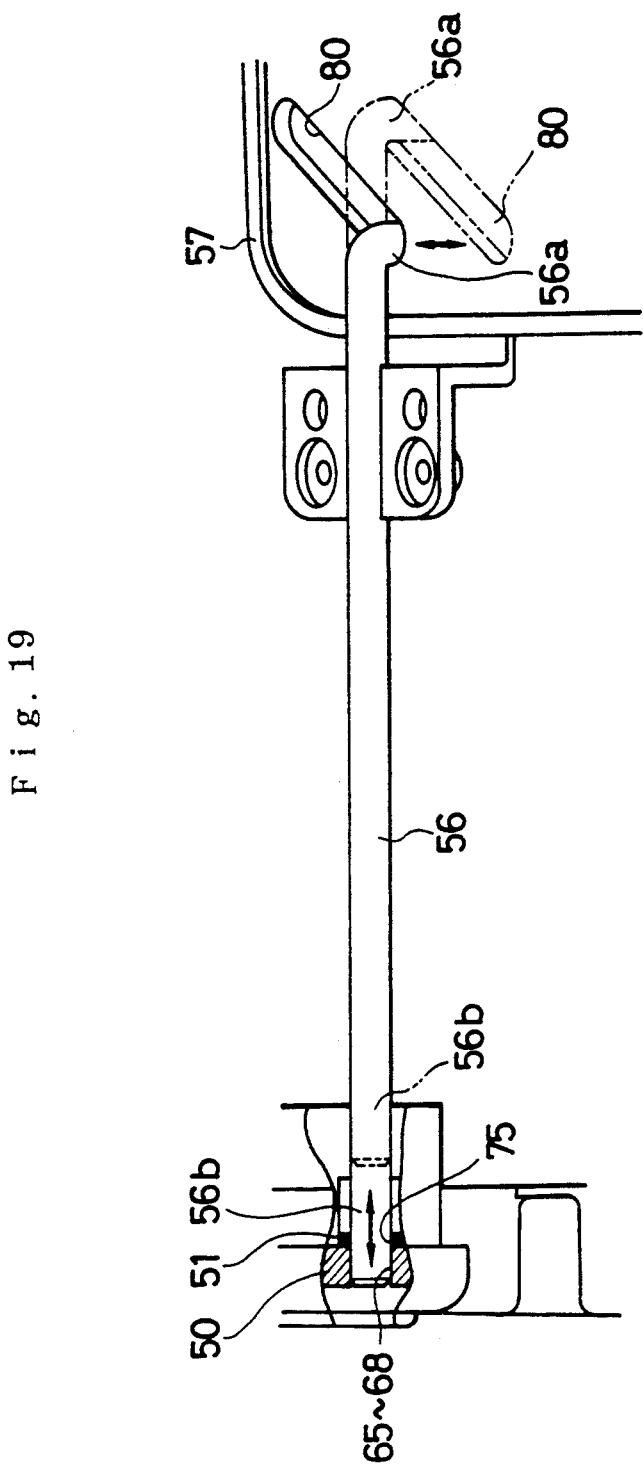
FIG. 19 is a view for describing the operation of the locking pin and cam plate in the seat-back tilting control device of this embodiment.

As illustrated in (a) through (c) in FIG. 17, the case 58 is formed as a flat plate and has a main body 58a one side surface of which is provided with a pair of parallel upstanding side walls 58b, 58c extending in the longitudinal direction. As indicated by the phantom lines in (c) of FIG. 17, the cam plate 57 is disposed so as to be movable in the longitudinal direction of the case within a space delimited by the main body 58a and the two side walls 58b, 58c. In this case, the cam plate 57 moves while being guided along the guiding surface 58d of the main body 58a owing the fact that the guide portions 57b abut against the guiding surface 58d, and while being guided along the two side walls 58, 58c. Further, the one side surface of the main body 58a is provided with an upstanding projection 58e that mates with a projection 91 (shown in FIG. 18) on the pin cover 84.

The two side walls 58b, 58c are each provided with a locking-pin through-hole 85 through which the locking pin 56 is capable of being inserted. A pair of guides 86, 87 which guide the locking pin 56 are provided in an upstanding attitude, so as to correspond to the locking-pin through-holes 85, between the two side walls 58b, 58c on the one side face of the main body 58a. Guiding supports 88 for the locking pin 56, which supports have a semicircular recess the diameter of which is the same as that of the locking-pin through-hole 85, are provided on the outer side of the side walls 58b, 58c of the main body 58a. Mounting portions 89 to which the pin cover 84 is attached are provided on both sides of each of the guiding supports 88. Further, the other side surface of the main body 58a is provided with a mounting portion 90 for mounting the case 58 on the seat-portion body 7.

As illustrated in FIG. 18, the pin cover 84 is provided at the center of its main body 84a with the upstanding projection 91 formed to have a circular hole 92. The circular hole 92 mates with the projection 58e of the case 58, as mentioned above, whereby the case 58 and the pin cover 84 are positioned. The main body 84a is provided with a pair of guide slots 93, 94 in each of which is inserted the tip of the cam follower 56a of the locking pin 56 passed through the cam slots 80, 81. The cam follower 56a is capable of moving along the guide slots 93, 94.

Further, the left and right edges of the main body 84 are provided with guiding supports 95 for the locking pin 56, which supports have a semicircular recess the diameter of which is the same as that of the locking-pin through-holes 85. The recess of each guiding support 95 cooperates with the recess of the guiding support 88 in the case 58 so as to form a locking-pin through-hole the diameter of which is equal to that of the locking-pin through-hole 85 of case 58.

Accordingly, the locking pin 56 is guided by the guide slots 93, 94, the pair of guides 86, 87, the locking-pin through-hole 85 and the locking-pin through-hole formed by the recess of the guiding support 95 and the recess of the guiding support 88. As a result, movement of the locking pin 56 is reliable and smooth.

Mounting portions 96 are provided on both sides of each guiding support 95. By attaching the mounting portions 96 to the mounting portions 89 of the case 58, the pin cover 84 is attached to the case 58.

With the cam plate 57 and pin cover 84 installed in the case 58, the biasing spring 97 is compressed between the projection 92 of the pin cover 84 and the hole 83 of the cam plate 57, as depicted in FIG. 2. The biasing spring 97 constantly urges the cam plate 57 upward and diagonally to the left in FIG. 2 with respect to the case 58. Accordingly, in the ordinary state, the locking pin 56 is situated at the lowermost end of the diverging cam holes 80, 81 in FIG. 16(a).

As illustrated in FIG. 2, the operating-force transmitting link 59 has one end thereof connected to the hole 55e of the connecting portion 55d of operating lever 55. The other end of the link 59 is connected to the hole 82 of the cam plate 57. The operating-force transmitting lever 59 is capable of being formed from a conventional common force-transmitting link, such as a rod, an inner cable, an outer cable or a combination thereof, and an appropriate location along the link 59 is supported on the seat-portion body 7.

In the seat-back tilting control device 4 thus constructed, the cam follower 56a of the locking pin 56 ordinarily is set at the lowermost end of the cam slots 80, 81 by the biasing spring 97, as described above, and the locking pin 56 is projecting to the maximum degree. With the locking pin 56 in this state, as shown in Fig. 22, the locking portion 56b is fitted into any one of the locking holes 65, 66, 67, 68 and the through-hole 75. The locking pin 56 therefore is in the locking position. As a result, the seat back 3 is set at a prescribed reclining angle or in the folded position. When the cam plate 57 is moved downward in FIG. 22 by pulling the operating lever 5 forward, the cam follower 56a is guided by the cam slot 80, and therefore the locking pin 56 moves to the right. When the cam follower 56a is situated at the uppermost end of the cam slot 80, as indicated by the phantom lines, the locking portion 56b exits completely from one of the locking holes 65, 66, 67, 68 and from the through-hole 75, whereby the locking pin 56 assumes the unlocking position. As a result, the seat back 3 is free to tilt. Thus, in the present embodiment, the seat-back tilting control device 4 functions as both reclined-state locking means for locking the seat back 3 at a predetermined reclining angle and folded-state locking means for locking the seat back 3 in the folded position.

The infant seat belt device 5 includes left and right shoulder belts 5a, a chest-contact pad 5b connected to the shoulder belts 5a, a tongue 5c attached to the lower end of the chest-contact pad 5b, the buckle 5d with which the tongue 5c locks, and a retractor 5e for taking up a webbing, which unites the left and right shoulder belts 5a into a single body, through the back of the seat back 3. The infant seat belt device 5 is substantially identical with that of the prior art.

Figure 20A:
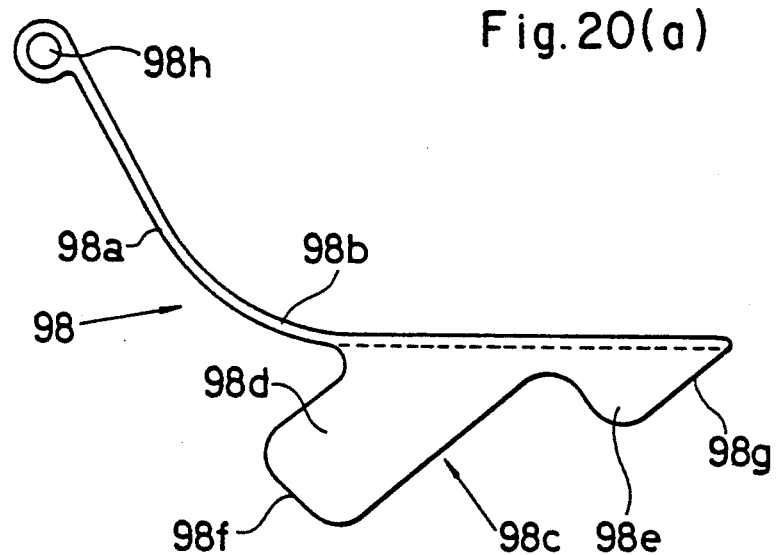
FIG. 20 illustrates a cover seat in this embodiment, in which (a) is a side view thereof and (b) a front view.
Figure 20B:
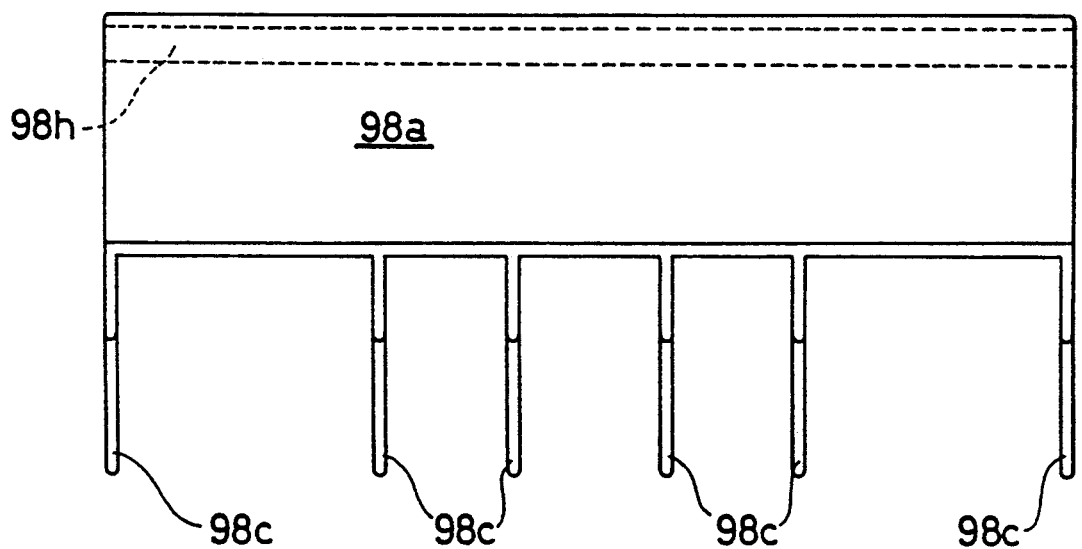

As depicted in FIGS. 1 and 2, a cover seat 98 is supported on the turning shaft 20, which tiltably supports the seat back 3 relative to the seat portion 2, so as to be capable of tilting between the position indicated by the solid line and the position indicated by the phantom line in FIG. 2, the cover seat 98 being situated between the left and right lower brackets 51. As illustrated in FIG. 20, the cover seat 98 has a curving main body 98a the upper surface of which defines a seat surface 98b for seating an infant. The lower surface of the main body 98a is provided with a predetermined number of ribs 98c. The ribs 98c, which are formed to be identical in shape, have a rectangular first projection 98d and a triangular second projection 98e. The upper end of the cover seat 98 is provided with a hole 98h into which the turning shaft is loosely fitted.

The cover seat 98 is formed in such a manner that when it is at the position indicated by the solid line in FIG. 2, it will cover the second recess of the seat-portion body 7 and cooperate with the seat surface 7a at the forward part of the seat-portion body 7 and a seat-back surface 31a of the seat back portion 31, which constitutes the seat back 3, to render continuous the seat surface of the protective seat 1 and the surface of the seat back. As a result, the infant can be seated safely and reliably. In this case, as illustrated in FIG. 2, a tip 98f of the first projection 98d comes into abutting contact with one inclined surface of the V-shaped second recess 14, and an oblique end 98g of the second projection 98e comes into abutting contact with the other inclined surface of the second recess 14. As a result, the weight of the seated infant is reliably supported on the seat-portion body 7 via the ribs 98c.

Figure 21:
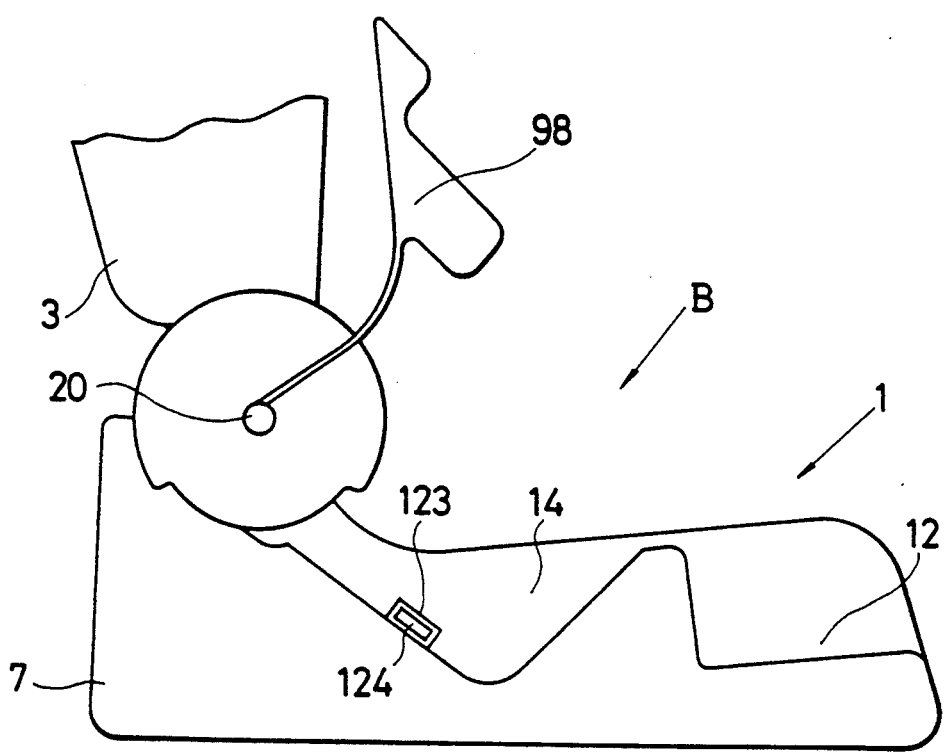
FIG. 21 is a view for describing the action of the cover seat.

When the cover seat 98 is at the position indicated by the phantom line in FIG. 2, on the other hand, it opens the second recess 14 of the seat-portion body 7. As result, when the protective seat 1 is attached to and detached from a vehicle seat, as shown in FIG. 21, the operation for fastening and unfastening of the tongue 123 and buckle 124 of the seat belt device, which is installed at the vehicle seat and situated in the second recess 14, can be performed easily from above the front of the protective seat 1 (i.e., from the direction of arrow B). In particular, when it is difficult to secure the protective seat 1 to the vehicle seat from the sides of the vehicle seat whose width is only slightly larger than the width of the protective seat 1, as in a vehicle seat both sides of which have wings or arm rests, the operation for attaching and detaching the protective seat is greatly simplified.

As illustrated in FIGS. 1 and 2, the shoulder-belt adjusting device 6 includes the belt guide 101 for guiding the shoulder belts of the infant seat belt in such a manner that the position of the shoulder belts can be adjusted up or down, the supporting means 102 for supporting the belt guide 101, the vertically extending screw shaft 103 for moving the supporting means 102 up and down, the operating knob 104 turnably attached to one of the left and right side walls 32, 33 (the left side wall 33 in the example illustrated) of the seat back 3, and the torque link 105 which connects the operating knob 104 and the screw shaft 103 while producing a right-angle change in direction, and which transmits the rotational torque of the operating knob 104 to the screw shaft 103. The torque link 105 is capable of being formed of a resilient torque link used generally in the prior art.

As depicted in FIG. 22, the belt guide 101 has a main body 101a comprising an elongated flat plate having the shape of a parallelogram. The main body 101a has a slot 106, which is provided substantially at the middle thereof, through which the shoulder belt of the infant seat belt is slidably passed, and is integrally formed to have a cylindrical portion 107 extending from one side of the main body 101 to the other side thereof. Furthermore, one end of the cylindrical portion 103 is formed to have a flange 104. The other end of the cylindrical portion 107 is provided with a grip portion 110 which grips a cylindrical member 109 of the supporting means 102.

As indicated by the phantom line in FIG. 3, the seat cover 111 is attached to the seat back 3 via a cushion 112. The seat cover 111 and the cushion 112 are formed to have holes of the same shape as the guide slots 34, 35 at positions corresponding to the guide slots 34, 35 of the seat back 3. The cylindrical portion 107 between the main body 101a and the flange 108 slidably penetrates these holes in the cover 111 and cushion 112. Accordingly, the cover 111 and the cushion 112 are situated between the main body 101a and the flange 108.

The main body 101a on the side of the grip portion 110 is in abutting contact with the seat back 31 of the seat back, as shown in FIG. 3, and the belt guide 101 is capable of sliding along the main body 101a. Further, the cylindrical portion 107 between the main body 101a and the grip portion 110 is passed through the guide slots 34, 35 and is capable of sliding while being guided by the guide slots 34, 35. Accordingly, the belt guide 101 is capable of moving between an upper-limit position (the position at which the slot 106 is indicated by the solid line) C at which the cylindrical portion 107 abuts against the upper end of the guide slots 34, 35, and a lower-limit position (the position at which the slot 106 is indicated by the phantom line) D at which the cylindrical portion 107 abuts against the lower end of the guide slots 34, 35.

In this case, the main body 101a is designed to have such a size that the guide slots 34, 35 and the holes in the cover 111 and cushion 112 can be closed even when the cylindrical portion 107 of the belt guide 101 is situated at a position between the upper-limit position and the lower-limit position. The external shape of the flange 108 is formed to be larger than that of the guide slots 34, 35, and therefore the cover 111 and cushion 112 may be easily detached from between the flange 108 and main body 101a.

Figure 23:
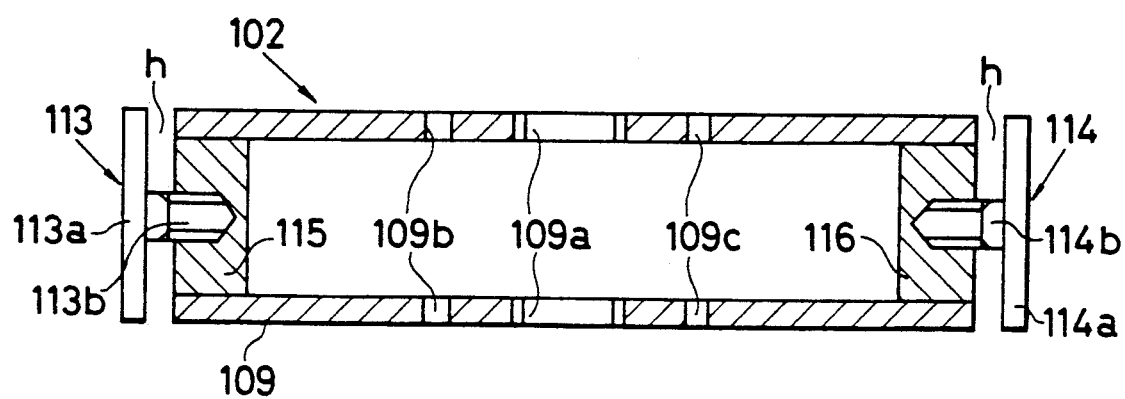
FIG. 23 is a front view showing supporting means of the shoulder-belt adjusting device in this embodiment, with a portion thereof being cut away.

The supporting means 102 includes the cylindrical member 109 and guides 113, 114 fixedly secured to the left and right ends of the cylindrical member 109, as illustrated in FIG. 23. The central part of the cylindrical member 109 is formed to have female threads that are threadedly engaged by the screw shaft 103, and holes 109b, 109c, through which bolts for securing the grip portion 110 of the belt guide 101 are passed, are provided in the cylindrical member on both sides of the female threads 109a. The guides 113, 114 respectively comprise disk-shaped guide portions 113a, 114a and screw portions 113b, 114b upstanding from the centers of the guides. The guides 113, 114 are screwed respectively into closing members 115, 116 secured in the two ends of the cylindrical member 109 so as to form prescribed gaps h, whereby the guides 113, 114 are fixed to the cylindrical member 109.

The screw portions 113b, 114b of the respective guides 113, 114 are passed through the guide slots 69 of the upper brackets 50 secured to the left and right side walls of the seat back 3, and the upper brackets 50 are situated in the gaps h so that the supporting means 102 is attached so as to be movable up and down while being guided by the guide slot 69. A laterally directed force, a longitudinally directed force and moments about these directions acting upon the cylindrical portion 109 are supported by the upper brackets 50.

As shown in FIGS. 1 and 2, the screw shaft 103 is threadedly engaged with the female threads 109a of the cylindrical member 109, and the upper and lower ends of the screw shaft 103 are supported respectively by the brackets 36, 37 of the seat back 3. With regard to the bracket 36 on the upper side in this case, the upper end of the screw shaft 103 is supported so as to be capable solely of rotation in the free state in the thrust direction. With regard to the bracket on the lower side, the lower end of the screw shaft 103 is supported so as to be capable of rotation in the supported state in the thrust direction. Accordingly, the up-and-down force which acts upon the cylindrical member 109 is supported by the bracket 37 on the lower side via the screw shaft 103 and is not supported by the bracket 36 on the upper side. As a result, though it is necessary for the bracket 37 on the lower side to be made comparatively large for reasons of strength, it will suffice if the bracket 36 on the upper side is comparatively small. This means that although the seat back 3 is tilted back when the protective seat 1 is in use, as shown in FIG. 2, the amount of projection of the protective seat 1 to the rear is small owing to the fact that the upper bracket 36 is small. Accordingly, when the protective seat is secured to the seat of the vehicle, the seat 1 is prevented from being secured to far forward relative to the vehicle seat. By virtue of this feature, the body of the infant can be kept a greater distance away from the parts of the vehicle in front of the seat, and the protective seat 1 can be secured to the vehicle seat more stably and reliably.

As shown in FIG. 2, one end of the torque link 105 is connected to the lower end of the screw shaft 103 in such a manner that it is incapable of rotating relative to the screw shaft 103. The torque link 105 is bent at right angles from the vertical direction and extends to the left, and the other end thereof is rotatably supported on the bracket 44 secured to the seat back 3. This end of the torque link 105 serves as a connecting portion 105a formed to have an angular cross section. The connecting portion 105a is directed leftward in reliable fashion by the bracket 44.

The operating knob 104 is turnably attached to the left side wall 32 of the seat back 3 at a position opposing the connecting portion 105a of the torque link 105. In this case, the operating knob 104 is capable of being attached and detached to and from the left side wall 32 by a force greater than a prescribed value. The end portion of the turning shaft 104a of the operating knob 104 is provided with a hole 104b the sectional shape of which is similar to but somewhat larger than the sectional shape of the connecting portion 105a of torque link 105. Accordingly, when the operating knob 104 is inserted into and attached to the left side wall 32, the connecting portion 105a is fitted into the hole 104b, as a result of which the turning shaft 104a and connecting portion 105a are connected to make only rotation impossible. In this case, the turning shaft 104a is guided by a guide 118, and therefore the turning shaft 104a and connecting portion 105a are capable of being connected easily and reliably.

As shown in FIG. 1, the supporting means 102, screw shaft 103 and torque link 105 are covered by the cover 126.

In the case of this embodiment, the operating knob 104 is disposed on the left side wall 32. By adopting this arrangement, the amount of rearward projection of the seat back 3 is reduced in comparison with a case in which the operating knob 32 is provided on the upper portion of the seat back 3. Accordingly, when the infant-restraining protective seat 1 is secured to a vehicle seat, the protective seat 1 is prevented from being secured too far forward relative to the vehicle seat, just as described above. Though the operating knob 104 is disposed on the left side wall 32 in this embodiment, the operating knob 104 can be disposed on the right side wall 33 if desired.

When the operating knob 104 is turned in the shoulder-belt adjusting device 6 thus constructed, the rotational torque is transmitted to the screw shaft 103 via the torque link 105, whereby the screw shaft 103 is turned. Turning the screw shaft 103 in one direction lowers the belt guide 101, whereas turning the screw shaft 103 in the other direction raises the belt guide 101. Thus, the position of the shoulder belts of the infant seat belt device can be continuously adjusted up and down.

In the embodiment described above, a case is described in which the present invention is applied to an infant-restraining protective seat wherein the seat portion and the seat back are tiltably connected. However, the invention is not limited to this arrangement. For example, the invention is applicable to the commonly used conventional infant-restraining protective seat such as one in which the seat portion and seat back are integrally molded into a unitary body.

In accordance with the infant-restraining protective seat according to the present invention, as evident from the foregoing description, the shoulder belts can be positionally adjusted up or down in stepless fashion in conformity with the build of the seated infant.

Further, since the influence of the operating knob upon the amount of rearward projection of the protective seat is almost nil, the amount of rearward projection of the protective seat can be reduced even further. Further, since the influence of the bearing portion of the screw shaft upon the amount of rearward projection of the protective seat also is almost nil, the amount of rearward projection of the protective seat can be reduced irrespective of the bearing portion. As a result, the protective seat can be placed toward the rear of the vehicle seat. Accordingly, the infant can be kept a greater distance away from the parts of the vehicle in front of the seat, and the protective seat can be secured to the vehicle seat more stably and reliably.

As many apparently widely different embodiments of the present invention can be made without departing from the spirit and scope thereof, it is to be understood that the invention is not limited to the specific embodiments thereof except as defined in the appended claims.

What is claimed is:

1. An infant-restraining protective seat comprising:
   a set portion for seating an infant;
   a seat back for supporting the back of the seated infant; and
   an infant seat belt device for restraining and protecting the seated infant;
   said seat back being provided with a shoulder-belt adjusting device, said shoulder-belt adjusting device having:
   a belt guide for guiding shoulder belts of said infant seat belt device up and down;
   a screw shaft disposed vertically in the belt guide and having at least its lower end supported for rotation but fixed axially for moving said belt guide up and down;
   a torque link, which has one end connected to said screw shaft and its other end arranged so as to perpendicularly intersect the axial direction of said screw shaft, for transmitting rotational torque to said screw shaft; and
   an operating knob provided on either the left or right side of said seat back and having the other end of said torque link connected thereto for applying the rotational torque to said torque link.

* * * * *